United States Patent [19]
Hamada et al.

[11] Patent Number: 5,965,294
[45] Date of Patent: Oct. 12, 1999

[54] HYDROGEN ABSORBING ALLOY ELECTRODE

[75] Inventors: Yuichi Hamada; Yoshihiro Kubota, both of Annaka; Hiroto Sugahara, Takefu, all of Japan

[73] Assignee: Shin-Etsu Chemical Co., Ltd., Tokyo, Japan

[21] Appl. No.: 08/916,364

[22] Filed: Aug. 22, 1997

[30] Foreign Application Priority Data

Aug. 23, 1996 [JP] Japan .................................. 8-241297
Aug. 23, 1996 [JP] Japan .................................. 8-241298
Aug. 23, 1996 [JP] Japan .................................. 8-241299

[51] Int. Cl.$^6$ ..................................................... H01M 4/40
[52] U.S. Cl. ........................ 429/218.2; 429/223; 420/900
[58] Field of Search ........................... 420/900; 429/223, 429/218.2; 524/805, 544

[56] References Cited

U.S. PATENT DOCUMENTS

| | | | |
|---|---|---|---|
| 4,414,280 | 11/1983 | Silva et al. | 428/422 |
| 4,434,116 | 2/1984 | Covitch | 264/49 |
| 4,994,334 | 2/1991 | Ikoma et al. | 429/206 |
| 5,250,369 | 10/1993 | Yuasa et al. | 429/59 |
| 5,527,638 | 6/1996 | Kinoshita et al. | 429/101 |

FOREIGN PATENT DOCUMENTS 0386305  12/1990  European Pat. Off. .

OTHER PUBLICATIONS

Patent Abstracts of Japan, vol. 097, No. 008, Aug. 29, 1997, Publication No. 09 097605.

*Primary Examiner*—Maria Nuzzolillo
*Assistant Examiner*—Monique M. Wills
*Attorney, Agent, or Firm*—Millen, White, Zelan & Branigan, P.C.

[57] ABSTRACT

Provided is a hydrogen absorbing alloy electrode having on a conductive support surface a hydrogen absorbing alloy layer which comprises a hydrogen absorbing alloy powder capable of absorbing and desorbing hydrogen electrochemically and a binder; with the hydrogen absorbing alloy layer having a surface coated spotwise with an amorphous water-repelling fluoropolymer at a total coverage of 0.001 mg/cm$^2$ to 5 mg/cm$^2$, wherein a solution of the fluoropolymer in a solvent having a boiling point of 50°–110° C. is spray-coated on the alloy layer surface.

8 Claims, No Drawings

HYDROGEN ABSORBING ALLOY ELECTRODE

FIELD OF THE INVENTION

The present invention relates to a hydrogen absorbing alloy electrode used as a negative electrode in an alkali storage battery, wherein an alloy capable of reversibly absorbing and desorbing hydrogen is utilized, and more particularly to a hydrogen absorbing alloy electrode having suitability for the control of the internal pressure of an alkali storage battery.

BACKGROUND OF THE INVENTION

Storage batteries which have been prevailingly used are, as well known, a nickel-cadmium storage battery and a lead storage battery. As the range of their use have been increasing in recent years, however, the development of storage batteries having lighter weight, higher capacitance and higher energy density has come to be desired eagerly.

Quite recently, a metal-hydrogen alkali storage battery wherein a hydrogen absorbing alloy is used as a negative electrode and nickel hydride as a positive electrode has come into the limelight.

While such a nickel-hydrogen alkali storage battery is charged with electricity, the hydrogen absorbing alloy electrode electrolyzes the water in an alkali electrolytic solution and absorbs the hydrogen gas produced by the electrolysis. During the discharge, on the other hand, the hydrogen absorbing alloy electrode releases the hydrogen gas and, at the same time, oxidizes the hydrogen gas to return it to the state of water.

When the storage battery is overcharged for the purpose of rapid charging, however, not only oxygen gas is generated from the positive electrode but also hydrogen gas is generated from the negative electrode, and thereby the internal pressure of the storage battery is increased.

This is being the case, it has been proposed to design the negative electrode so as to have a greater charging capacity than the positive electrode, thereby generating oxygen gas preferentially upon charging. Therein, the oxygen gas generated preferentially is made to react with the hydrogen gas produced on the negative electrode to be converted into water; as a result, a rise in the internal pressure of the storage battery can be controlled.

An increase in the charging capacity of the negative electrode, although it can inhibit the increase in an internal pressure of the battery upon overcharging, has a defect that it requires correlatively a decrease in the volume occupied by the positive electrode in the storage battery to result in the lowering of the battery capacity.

For the purpose of obviating such a defect, it has been proposed to coat the electrode surface with a fluorine-containing water repellent to form thereon a three-phase interface of gas, liquid and solid, thereby making an improvement in hydrogen absorbing properties of the electrode (Japanese Tokkai Hei 2-250260 and Japanese Tokkai Hei 2-291665). In coating such a water repellent on the negative electrode, a solvent-insoluble resin, such as a polytetrafluoroethylene resin or a tetrafluoroethylene-hexafluoroethylene copolymer resin, has been used in the form of dispersion, so that the foregoing measure has a drawback of requiring much time and labor for formation and drying of the coat of water repellent.

SUMMARY OF THE INVENTION

As a result of our investigations on easy formation of a three-phase interface of gas, liquid and solid by the use of a solvent-soluble amorphous fluoropolymer, it has been found that very satisfactory results can be obtained when an amorphous fluoropolymer is dissolved in a solvent having a boiling point of 50°–110° C. and spray-coated on a hydrogen absorbing alloy electrode, thereby achieving the present invention.

Therefore, an object of the present invention is to provide a hydrogen absorbing alloy electrode which ensures effective control of the internal pressure in an alkaline storage battery and has very high production suitability.

The above-described object of the present invention is attained with a hydrogen absorbing alloy electrode having on a conductive support surface a hydrogen absorbing alloy layer which comprises a hydrogen absorbing alloy powder capable of absorbing and desorbing hydrogen electrochemically and a binder; with the hydrogen absorbing alloy layer having a surface coated spotwise with an amorphous water-repelling fluoropolymer at a total coverage of 0.001 mg/cm$^2$ to 5 mg/cm$^2$, wherein a solution of the fluoropolymer in a solvent having a boiling point of 50°–110° C. is spray-coated on the alloy layer surface.

DETAILED DESCRIPTION OF THE INVENTION

The conductive support used in the present invention can be selected properly from conventional materials, such as a punched metal and foam nickel.

The hydrogen absorbing alloy used in the present invention does not have any particular restriction, but can be appropriately selected from known hydrogen absorbing alloys which have so far been used for hydrogen absorbing alloy electrodes. In view of cheapness and suitability for mass production, it is desirable to use a hydrogen absorbing alloy produced using a "Mish metal" (Mm) as a main raw material, such as a MmNi$_5$ alloy. More specifically, the MmNi$_5$ alloy is a LaNi$_5$ alloy in which the lanthanum (La) is partially replaced by other rare earth elements, and has a CaCu$_5$-type crystal structure.

Herein, the symbol "Mm", referred to as "a Mish metal", is a mixture of La, Ce, Pr, Nd and other rare earth elements. For instance, Mm is constituted of 50 weight % of Ce, 30 weight % of La, 15 weight % of Nd and the residual % of other rare earth elements.

The layer of a hydrogen absorbing alloy can be provided on the surface of a conductive support as follows: To a hydrogen absorbing alloy powder, an aqueous solution of known binder, such as polyvinyl alcohol, is added in such an amount as to adjust the solid concentration in the range of 0.3 to 5 weight %, and kneaded to prepare a paste. The paste is coated on a conductive support, dried and then pressed; or it is formed into a sheet, and attached to a conductive support surface using pressure. It is desirable for the hydrogen absorbing alloy layer to have a thickness of from 0.3 to 0.6 mm.

The fluoropolymer used in the present invention does not have any particular restriction, provided that it can repel water and dissolve in a solvent having a boiling point of from 50° to 110° C. Preferably, the fluoropolymer used in the present invention can be selected from among perfluorobutenylvinyl ether polymers having constitutional repeating units of the following formula (I), perfluoroallylvinyl ether polymers having constitutional repeating units of the following formula (II) or tetrafluoroethylene/perfluoro-2,2-dimethyl-1,3-dioxol copolymers having constitutional repeating units of the following formula (III):

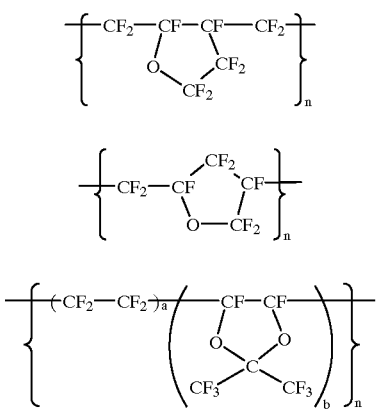

The fluoropolymers as illustrated above can be synthesized, e.g., in the following manners respectively:

Synthesis of Perfluorobutenylvinyl Ether Polymer (Formula (I));

In a stainless-steel shaker are placed 10 g of perfluorobutenylvinyl ether produced in accordance with the method described in *Journal of Organic Chemistry*, vol. 34, p. 1841 (1969) and 0.020 g of bisperfluorobutyryl peroxide, and the shaker is closed. Then, the shaker is cooled to about −50° C.

After the procedure of exchanging the gas in the shaker for nitrogen gas is repeated three times, the shaker is shaken for about 3 days at room temperature. Then, acetone is added thereto, and the precipitate is washed twice with acetone, followed by drying at 100° C. in a vacuum. Thus, a solid polymer is obtained.

Synthesis of Tetrafluoroethylene/Perfluoro-2,2-dimethyl-1, 3-oxol Copolymer (Formula (III));

1,1,2-Trichloro-1,2,2-trifluoroethane in an amount of 250 g is placed in a stainless-steel vessel, and thereto 15 g of perfluoro-2,2-dimethyl-1,3-dioxol prepared in accordance with the method described in U.S. Pat. No. 3,978,030 and 0.011 g of perfluoropropionyl peroxide are added to prepare a solution. The solution is cooled to about −50° C. Then, the air is exhausted from the vessel, and 3.66 g of tetrafluoroethylene is further added to the solution. The resultant solution is heated to about 55° C., and stirred for about 4 hours.

After the solution is cooled again and degassed, the 1,1,2-trichloro-1,2,2-trifluoroethane is distilled away, and the polymer residue is dried in a vacuum. Thus, a solid matter is obtained.

From a viewpoint of the adhesiveness to an electrode surface, it is desirable for the fluoropolymer used in the present invention to have at least one polar group, such as an amino group, a hydroxyl group, a carbonyl group, a carboxyl group or an ester group, at the end of the polymer chain. In particular, the present invention prefers a fluoropolymer having at least one carboxyl group and/or ester linkage at the end of the polymer chain. Such a polar group can be introduced into the chain end of the fluoropolymer as illustrated above in accordance with conventional methods.

As for the solvent having a boiling point of from 50° to 110° C., any solvent can be employed in the present invention as far as the fluoropolymer used is soluble therein. In cases where the fluoropolymers of formulae (I), (II) and (III) are used, perfluorohexane and perfluoro-2-butyltetrahydrofuran are suitable solvents for those polymers.

When the solvent has a boiling point lower than 50° C., the spray-coated fluoropolymer tends to have very rough surface and low adhesiveness to the electrode surface due to too quick evaporation of the solvent; while, when the boiling point of a solvent used is higher than 110° C., the coating solution spray-coated on an electrode surface tends to run and form a film free from gaps and pores over the whole surface of the electrode due to too slow evaporation of the solvent. Therefore, such solvents are unsuitable for the present invention.

In the present invention, it is desirable to apply a solution of fluoropolymer to the electrode surface by means of a spray coating technique at a dry coverage of 0.001 to 5.0 mg/cm$^2$, preferably 0.01 to 1.0 mg/cm$^2$. When the coverage is less than 0.001 mg/cm$^2$, the effect of a fluoropolymer as a water repellent is insufficient; while, when it is more than 5.0 mg/cm$^2$, the applied fluoropolymer forms a film to have a bad effect upon dispersion of hydrogen gas into the electrode.

The present hydrogen absorbing alloy electrode can be prepared by providing on a conductive support a hydrogen absorbing alloy layer comprising a hydrogen absorbing alloy powder and a small amount of binder in accordance with a conventional method, and then spray-coating a fluoropolymer dissolved in a solvent having a boiling point of from 50° to 110° C. on the hydrogen absorbing alloy layer at a dry coverage of 0.001 mg/cm$^2$ to 5 mg/cm$^2$ so that the fluoropolymer is applied spotwise to the alloy layer, followed by drying.

In accordance with the present invention, the electrode surface is coated spotwise with a fluoropolymer, so that the present electrode can reduce a rise in the internal pressure of a closed-type secondary storage battery upon charging, particularly upon rapid charging, and can have consistent gas absorption characteristics for a long time. Thus, the present electrode used in a storage battery ensures a high capacity and rapid charging to the battery.

The present invention will now be illustrated in greater detail by reference to the following examples. However, the invention should not be construed as being limited to these examples.

EXAMPLE 1

Mish metal (Mm), Ni, Co, Mn and Al were weighed out in their respective amounts such that the atomic ratio of those metals was 1.0:3.75:0.75:0.20:0.30, and molten with a high-frequency furnace to produce an alloy. After heat treatment, the alloy was cooled, and ground mechanically to prepare a hydrogen absorbing alloy powder.

The alloy powder obtained was formed into a paste by kneading together with a 3 weight % water solution of polyvinyl alcohol. The paste was filled homogeneously into a porous medium made of a foam nickel having a voids content of 94–96%, and then dried. The resulting material was subjected to a pressure forming process, thereby making a negative plate. The hydrogen absorbing alloy layer in this negative plate had a thickness of 300 to 600 μm.

On the surface of this negative plate, a solution of fluoropolymer in perfluoro-2-butyltetrahydrofuran was coated by means of a spray at various coverage rates shown in Table 1 to prepare hydrogen absorbing alloy electrodes a to h. The fluoropolymer used herein was a perfluorobutenylvinyl ether polymer having a polar group at the end of the polymer chain, Cytop CTXA Type (commercial name, a product of Asahi Glass Co., Ltd.). In addition, an electrode i was prepared without coating the foregoing fluoropolymer.

TABLE 1

| Electrode | Coverage Rate (mg/cm$^2$) |
| --- | --- |
| a | 0.0007 |
| b | 0.002 |
| c | 0.13 |
| d | 0.99 |
| e | 1.15 |
| f | 2.34 |
| g | 4.61 |
| h | 5.72 |
| i | — |

Then, sub-C-size closed storage batteries A to I having a nominal capacitance of 2,000 mAh were made by respectively using the negative electrodes a to i prepared above in addition to a positive electrode made of sintered Ni, a nonwoven polyamide fabric as a separator and a 6N water solution of potassium hydroxide an electrolyte, and examined for internal pressure while charging.

With respect to the charging condition, in the initial stage, from 1st to 20th cycle, each storage battery was charged at 0.2 C until its capacitance reached 150% of the nominal capacitance; from the 21st to 40th cycle, it was charged at 0.5 C until its capacitance reached 150% of the nominal capacitance; and from 41st to 60th, it was charged at 1.0 C until its capacitance reached 150% of the nominal capacitance.

As for the discharging condition, the discharge in every cycle was carried out at 0.2 C until the battery voltage was dropped to 1.0 V. In the course of charge-discharge cycles mentioned above, the internal pressures of each storage battery in the 20th, 40th and 60th cycles were measured. The data on the highest internal pressures in those cycles are set forth in Table 2.

TABLE 2

| | A | B | C | D | E | F | G | H | I |
| --- | --- | --- | --- | --- | --- | --- | --- | --- | --- |
| | | | | | | | | (kgf/cm$^2$) | |
| 20th cycle | 2.8 | 1.2 | 1.2 | 1.2 | 1.4 | 1.7 | 2.1 | 2.7 | 3.9 |
| 40th cycle | 6.0 | 2.6 | 2.5 | 2.9 | 2.8 | 2.8 | 3.5 | 6.1 | 8.3 |
| 60th cycle | 10.8 | 4.7 | 4.4 | 4.6 | 4.7 | 4.8 | 5.4 | 9.1 | 13.5 |

As can be seen from Table 2, the storage batteries A to H, in which the fluoropolymer coat was formed on the electrode surface, had lower internal pressures than the storage battery I. This indicates that the fluoropolymer coat brought about an appreciable improvement in gas absorption characteristics.

In particular, as shown by the results of the storage batteries B to G, the fluoropolymer coat having a coverage rate in the range of 0.01 to 1.0 mg/cm$^2$ was instrumental in effecting the lowering of internal pressure. As a reason for these limitations on the coverage rate, it can be thought that the water repelling effect obtained at the coverage rates lower than the foregoing range is too small and the dispersion of gas into the electrode becomes difficult at the coverage rates higher than the foregoing range. Moreover, it was found by the observation under a scanning electron microscope that, when the fluoropolymer was coated at a coverage rate higher than 5 mg/cm$^2$, a film thereof was formed all over the electrode surface but, on the other hand, the fluoropolymer was present spotwise on the electrode surface when the coverage rate thereof was not higher than 5 mg/cm$^2$. Thus, it was confirmed that the spotwise application of a fluoropolymer to the electrode surface was required for improvement in gas dispersion.

Further, other storage batteries were made in the same manner as described above, except that the water repelling layers having different porosities were formed on the negative plates respectively by adjusting coverage rates of the fluoropolymer so as to be in the intended range and using various coating solvents respectively, and examined for the internal pressure while charging by the same measuring procedures as described above. By this examination, it was confirmed that the internal pressure became lower and, in other words, the gas absorption characteristics becomes better the higher porosity the water repelling layer had.

The coating solvents used therein were perfluorohexane (bp., 58° C.), perfluoro-2-butyltetrahydrofuran (bp., 102° C.) and perfluorotributylamine (bp., 174° C.). Additionally, the same perfluorobutenylvinyl ether polymer as used above was employed for forming the water repelling layer. The internal pressures after the charge-discharge cycle described above was repeated 60 times are shown in Table 3.

TABLE 3

(Water repellent: Perfluorobutenylvinyl ether polymer)

| Solvent | Perfluoro-hexane | Perfluoro-2-butyl-tetrahydro-furan | Perfluoro-tributyl-amine |
| --- | --- | --- | --- |
| Boiling point (° C.) | 58 | 102 | 174 |
| Coverage rate (mg/cm$^2$) | 0.97 | 0.99 | 0.92 |
| Internal pressure (kgf/cm$^2$) | 3.8 | 4.6 | 8.4 |

The results shown in Table 3 prove that the fluoropolymer coating with a proper porosity can be formed on an electrode surface by specifying the range of the boiling point of a solvent used for the coating to ensure easy production of a hydrogen absorbing alloy electrode of excellent quality.

EXAMPLE 2

Hydrogen absorbing alloy electrodes were prepared in the same manner as in Example 1, except that a perfluoroallyvinyl ether polymer was used as a water repellent in place of the perfluorobutenylvinyl ether polymer used in Example 1.

In accordance with the same procedures as in Example 1, the hydrogen absorbing alloy electrodes having water repellent coatings differing in porosity were evaluated. The results obtained are shown in Table 4.

TABLE 4

(Water repellent: Perfluoroallylvinyl ether polymer)

| Solvent | Perfluoro-hexane | Perfluoro-2-butyl-tetrahydrofuran | Perfluoro-tributyl-amine |
|---|---|---|---|
| Boiling point (° C.) | 58 | 102 | 174 |
| Coverage rate (mg/cm$^2$) | 0.96 | 0.92 | 0.9 |
| Internal pressure* (kgf/cm$^2$) | 4.0 | 4.9 | 8.9 |

*: Internal pressure measured after 60 times' repetition of charge-discharge cycle The results shown in Table 4 also prove that the fluoropolymer coating with a proper porosity can be formed on an electrode surface by specifying the range of the boiling point of a solvent used for the coating to ensure easy production of a hydrogen absorbing alloy electrode of excellent quality.

EXAMPLE 3

Hydrogen absorbing alloy electrodes were prepared in the same manner as in Example 1, except that the copolymer of tetrafluoroethylene and perfluoro-2,2-dimethyl-1,3-dioxol was used as a water repellent in place of the perfluorobutenylvinyl ether polymer used in Example 1.

In accordance with the same procedures as in Example 1, the hydrogen absorbing alloy electrodes having water repellent coatings differing in porosity were evaluated. The results obtained are shown in Table 5.

TABLE 5

(Water repellent: Copolymer of tetrafluoroethylene and perfluoro-2,2-dimethyl-1,3-dioxol)

| Solvent | Perfluoro-hexane | Perfluoro-2-butyl-tetrahydro-furan | Perfluoro-tributyl-amine |
|---|---|---|---|
| Boiling point (° C.) | 58 | 102 | 174 |
| Coverage rate (mg/cm$^2$) | 0.95 | 0.91 | 0.92 |
| Internal pressure* (kgf/cm$^2$) | 3.9 | 4.9 | 8.0 |

*: Internal pressure measured after 60 times' repetition of charge-discharge cycle

What is claimed is:

1. A hydrogen absorbing alloy electrode having on a conductive support surface a hydrogen absorbing alloy layer which comprises a hydrogen absorbing alloy powder capable of absorbing and desorbing hydrogen electrochemically and a binder; said hydrogen absorbing alloy layer having a surface coated spotwise with an amorphous water-repelling fluoropolymer at a total coverage of 0.001 mg/cm$^2$ to 5 mg/cm$^2$, wherein a solution of said fluoropolymer in an organic solvent having a boiling point of 50°–110° is spray-coated on the alloy layer surface; wherein said fluoropolymer is selected from the group consisting of perfluorobutenylvinyl ether polymers, perfluoroallylvinyl ether polymers and tetrafluoroethylene/perfluoro-2,2-dimethyl-1, 3-dioxol copolymers.

2. A hydrogen absorbing alloy electrode according to claim 1, wherein said fluoropolymer is an amorphous fluoropolymer having at least one polar group at the end of the polymer chain.

3. A hydrogen absorbing alloy electrode according to claim 1 wherein said solvent is perfluorohexane or perfluoro-2-butyltetrahydrofuran.

4. A hydrogen absorbing alloy electrode according to claim 1, wherein the hydrogen absorbing alloy is an alloy comprising a Mish metal and nickel.

5. A hydrogen absorbing alloy electrode according to claim 1, wherein the thickness of the hydrogen absorbing alloy layer is from 0.3 to 0.6 mm.

6. A hydrogen absorbing alloy electrode according to claim 1, wherein the conductive support is foam nickel.

7. A hydrogen absorbing alloy electrode according to claim 3, wherein said solvent is perfluorohexane or perfluoro-2-butyltetrahydrofuran.

8. A hydrogen absorbing alloy electrode having on a conductive support surface a hydrogen absorbing alloy layer which comprises a hydrogen absorbing alloy powder capable of absorbing and desorbing hydrogen electrochemically and a binder, said hydrogen absorbing alloy layer having a surface coated spotwise with an amorphous solvent soluble water-repelling fluoropolymer at a total coverage of 0.001 mg/cm$^2$ to 5 mg/cm$^2$, wherein a solution of said solvent soluble fluoropolymer in a solvent having a boiling point of 50°–110° is spray-coated on the alloy layer surface; wherein said fluoropolymer is selected from the group consisting of perfluorobutenylvinyl ether polymers, perfluoroallylvinyl ether polymers and tetrafluoroethylene/perfluoro-2,2-dimethyl-1,3-dioxol copolymers.

* * * * *